United States Patent
Lim et al.

(10) Patent No.: US 11,803,717 B2
(45) Date of Patent: *Oct. 31, 2023

(54) DATA CAPTURE DEVICE

(71) Applicant: ZEBRA TECHNOLOGIES CORPORATION, Lincolnshire, IL (US)

(72) Inventors: Sunghun Lim, Bethpage, NY (US); JaeHo Choi, Whitestone, NY (US); Curt D. Croley, Stony Brook, NY (US); Chandra M. Nair, Mount Sinai, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/034,460

(22) Filed: Sep. 28, 2020

(65) Prior Publication Data

US 2021/0027031 A1 Jan. 28, 2021

Related U.S. Application Data

(63) Continuation of application No. 16/517,240, filed on Jul. 19, 2019, now Pat. No. 10,789,436.

(51) Int. Cl.
*G06K 9/22* (2006.01)
*G06K 7/10* (2006.01)
(Continued)

(52) U.S. Cl.
CPC ......... *G06K 7/10891* (2013.01); *G06F 1/163* (2013.01); *G06K 7/1404* (2013.01)

(58) Field of Classification Search
CPC ........... G06K 7/10881; G06K 7/10891; G06K 2007/10524; G06K 2007/10534
(Continued)

(56) References Cited

U.S. PATENT DOCUMENTS

| 5,305,181 A | 4/1994 | Schulz |
| 5,340,972 A | 8/1994 | Sandor |

(Continued)

FOREIGN PATENT DOCUMENTS

| CN | 302299309 S | 1/2013 |
| CN | 202736067 U | 2/2013 |

(Continued)

OTHER PUBLICATIONS

MS650 User's Manual, version 1.6. "Wireless Ring Barcode Scanner", Unitech Electronics Co., Ltd., 2017.
(Continued)

*Primary Examiner* — Daniel St. Cyr

(57) ABSTRACT

A data capture device includes: a primary housing supporting a data capture assembly and having inner and outer surfaces joined by a perimeter wall; and a mounting accessory coupled to the inner surface. The mounting accessory mounts the device on an operator index finger in either of: a side-mounted mode in which the primary housing is between the index finger and a thumb; and a top-mounted mode, in which the primary housing is on a back of the index finger. The device includes an accessory trigger on the mounting accessory and a primary trigger supported on the outer surface. In the top-mounted mode, the accessory trigger is between the index finger and the thumb, for activation by the thumb. In the side-mounted mode, the primary trigger is disposed on the side of the index finger for activation by the thumb of the operator.

4 Claims, 8 Drawing Sheets

(51) Int. Cl.
*G06F 1/16* (2006.01)
*G06K 7/14* (2006.01)

(58) Field of Classification Search
USPC ............ 235/462.01, 462.44, 462.45, 472.01
See application file for complete search history.

(56) References Cited

U.S. PATENT DOCUMENTS

| | | | |
|---|---|---|---|
| 5,404,001 A | 4/1995 | Bard et al. | |
| 5,543,610 A * | 8/1996 | Bard | G06F 1/163 |
| | | | 235/462.44 |
| 5,587,577 A | 12/1996 | Schultz | |
| 5,610,386 A | 3/1997 | Ball et al. | |
| 5,793,032 A | 8/1998 | Bard et al. | |
| 5,808,289 A | 9/1998 | Becker | |
| 5,831,261 A | 11/1998 | Plesko | |
| 5,837,990 A | 11/1998 | Shepard | |
| 6,006,994 A | 12/1999 | Piesko | |
| 6,010,071 A | 1/2000 | Bard et al. | |
| 6,098,877 A | 8/2000 | Barkan et al. | |
| 6,607,134 B1 | 8/2003 | Bard et al. | |
| 7,331,817 B1 | 2/2008 | Morris et al. | |
| D585,066 S | 1/2009 | Morris et al. | |
| 7,871,006 B2 | 1/2011 | Morris et al. | |
| 9,129,174 B2 * | 9/2015 | Choi | G06K 7/10009 |
| D740,827 S | 10/2015 | Sun | |
| 9,864,887 B1 | 1/2018 | Ngo | |
| D832,844 S | 11/2018 | Lim | |
| D833,438 S | 11/2018 | Lim et al. | |
| 10,459,495 B2 * | 10/2019 | Griffin | H04W 4/20 |
| 10,789,436 B1 * | 9/2020 | Lim | G06K 7/10891 |
| 2002/0030094 A1 * | 3/2002 | Curry | G06K 17/00 |
| | | | 235/375 |
| 2003/0158974 A1 | 8/2003 | Herrod et al. | |
| 2004/0176143 A1 | 9/2004 | Willins et al. | |
| 2008/0054039 A1 | 3/2008 | Wulff et al. | |
| 2008/0078838 A1 | 4/2008 | Morris et al. | |
| 2008/0296139 A1 | 12/2008 | Morris et al. | |
| 2009/0247299 A1 * | 10/2009 | Conticello | G06F 3/014 |
| | | | 463/37 |
| 2009/0266898 A1 * | 10/2009 | Miller | G06K 7/10881 |
| | | | 235/472.01 |
| 2010/0001076 A1 | 1/2010 | Wulff | |
| 2014/0249944 A1 * | 9/2014 | Hicks | G06Q 30/0281 |
| | | | 705/17 |
| 2015/0325091 A1 | 11/2015 | Hamilton et al. | |
| 2016/0063293 A1 | 3/2016 | Sun | |
| 2016/0180132 A1 | 6/2016 | Lim et al. | |
| 2016/0180133 A1 | 6/2016 | Oberpriller et al. | |
| 2016/0180136 A1 * | 6/2016 | Meier | G06K 7/10722 |
| | | | 235/462.1 |
| 2016/0227912 A1 * | 8/2016 | Oberpriller | F16M 13/04 |
| 2017/0024522 A1 | 1/2017 | Warner et al. | |
| 2017/0262678 A1 | 9/2017 | Lin et al. | |
| 2017/0330471 A1 | 11/2017 | Subiakto | |
| 2018/0167549 A1 | 6/2018 | Lim et al. | |
| 2018/0310699 A1 | 11/2018 | Oberpriller | |
| 2019/0197273 A1 | 6/2019 | Mazzone | |

FOREIGN PATENT DOCUMENTS

| | | |
|---|---|---|
| CN | 202815863 U | 3/2013 |
| CN | 203164983 U | 8/2013 |
| CN | 103824041 A | 5/2014 |
| CN | 203773559 U | 8/2014 |
| CN | 203870629 U | 10/2014 |
| CN | 303119529 S | 3/2015 |
| CN | 104573598 A | 4/2015 |
| CN | 204302988 U | 4/2015 |
| CN | 303377431 S | 9/2015 |
| CN | 105787405 A | 7/2016 |
| CN | 303825915 S | 8/2016 |
| CN | 303969063 S | 12/2016 |
| CN | 205959215 U | 2/2017 |
| CN | 106650548 A | 5/2017 |
| CN | 106888055 A | 6/2017 |
| CN | 304197641 S | 7/2017 |
| CN | 206557789 U | 10/2017 |
| CN | 206849033 U | 1/2018 |
| CN | 207008632 U | 2/2018 |
| CN | 207216622 U | 4/2018 |
| CN | 209265443 U | 8/2019 |
| CN | 305610705 S | 2/2020 |
| CN | 211264316 U | 8/2020 |
| EP | 574024 A2 | 12/1993 |
| EP | 729110 A1 | 8/1996 |
| EP | 930579 A2 | 7/1999 |
| EP | 1542332 A1 | 6/2005 |
| JP | 3211589 U | 7/2017 |
| KR | 101850919 B1 | 4/2018 |
| TW | 561262 B | 11/2003 |
| WO | 2004/099828 A2 | 11/2004 |
| WO | 2007/001656 A1 | 1/2007 |
| WO | 2008/030773 A2 | 3/2008 |
| WO | 2008/070634 A1 | 6/2008 |
| WO | 2018/201276 A1 | 11/2018 |
| WO | 2019/009197 A1 | 1/2019 |

OTHER PUBLICATIONS

MS650 User's Manual, "Wireless Ring Barcode Scanner", Unitech Electronics Co., Ltd, 2017.

Examination Report for Great Britain Patent Application No. 2219771.9 dated Jan. 9, 2023.

Novelty Search Report for Belgian Patent Application No. 2020/5519 dated Jan. 21, 2021.

Novelty Search Report for Dutch Patent Application No. 2026055 dated Aug. 11, 2021.

* cited by examiner

DATA CAPTURE DEVICE

BACKGROUND

Finger-mounted data capture devices, also referred to as ring scanners, can be used to capture barcodes and the like, e.g. for transmission to a computing device carried by the operator. Wearing a ring scanner may, however, impede certain other activities the operator of the ring scanner is required to perform.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
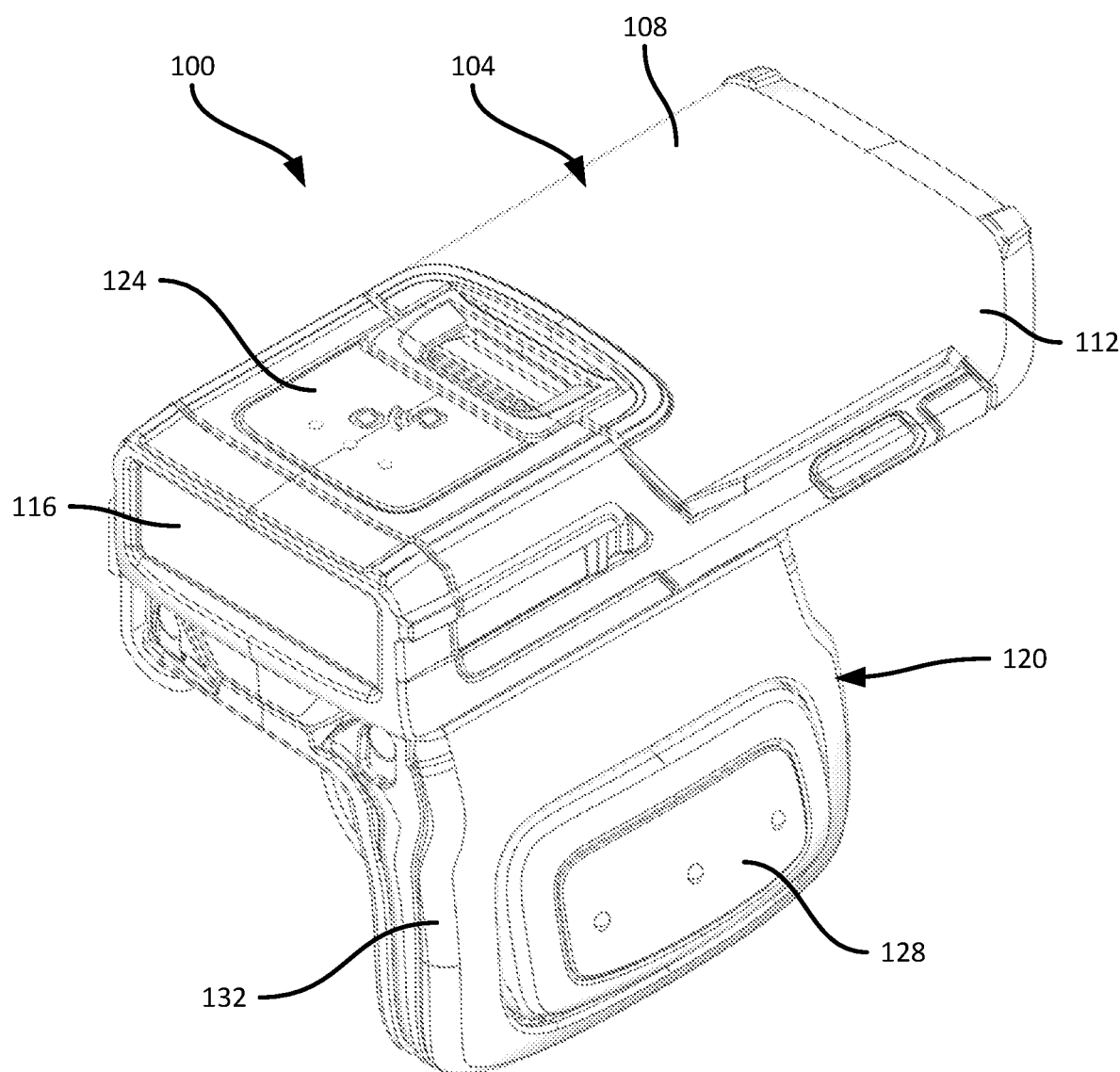
FIG. 1 is an isometric view of a data capture device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a data capture device, comprising: a primary housing supporting a data capture assembly and having inner and outer surfaces joined by a perimeter wall; a mounting accessory coupled to the inner surface of the primary housing, the mounting accessory configured to mount the data capture device on an index finger of an operator in either of: (i) a side-mounted operational mode, wherein the primary housing is disposed between the index finger and a thumb of the operator; and (ii) a top-mounted operational mode, wherein the primary housing is disposed on a back of the index finger; an accessory trigger supported on the mounting accessory such that in the top-mounted operational mode, the accessory trigger is disposed between the index finger and the thumb, for activation by the thumb of the operator; and a primary trigger supported on the outer surface of the primary housing such that in the side-mounted operational mode, the primary trigger is disposed on the side of the index finger for activation by the thumb of the operator.

Additional examples disclosed herein are directed to a data capture device, comprising: a primary housing supporting a data capture assembly and having inner and outer surfaces joined by a perimeter wall; a mounting accessory coupled to the inner surface of the primary housing, the mounting accessory configured to mount the data capture device on an index finger of an operator in a side-mounted operational mode, wherein the primary housing is disposed on a side of the index finger between the index finger and a thumb of the operator; and a primary trigger supported on the outer surface of the primary housing such that in the side-mounted operational mode, the primary trigger is disposed on the side of the index finger for activation by the thumb of the operator.

FIG. 1 depicts a data capture device 100 (also referred to herein simply as the device 100) configured to be worn on a hand of an operator (not shown). In particular, the device 100 is configured to be worn on an index finger of the operator. The device 100 includes a primary housing 104 that contains a data capture assembly such as barcode scanner (e.g. an image-based barcode scanner including one or more image sensors).

The primary housing 104 includes an outer surface 108, referred to as "outer" because in use the outer surfaces 108 faces outwards, away from the index finger on which the device 100 is mounted. The primary housing 104 also includes an inner surface opposite the outer surface (the inner surface is not visible in FIG. 1), and a perimeter wall 112 joining the outer surface 108 and the inner surface. The perimeter wall 112 includes a scan window 116 disposed in a forward portion thereof. The above-mentioned data capture assembly is located within the primary housing 104 such that image sensors or other suitable data capture sensors have a field of view extending out through the scan window 116.

The device 100 also includes a mounting accessory 120 coupled to the inner surface of the primary housing 104. As will be discussed below in greater detail, the mounting accessory 120 may be removably coupled to the primary housing 104. The mounting accessory 120 is configured to mount the device 100 on the index finger of the operator.

The device 100 includes a primary trigger 124 and an accessory trigger 128, each of which is configured to be activated by the operator (e.g. via depression of the relevant trigger by the thumb of the operator) to initiate a scanning operation via the data capture assembly. The primary trigger 124 is disposed on the outer surface 108 of the primary housing, while the accessory trigger 128 is disposed on the mounting accessory 120. More specifically, the accessory trigger 128 is disposed on a wall 132 of the mounting accessory 120 that is at a substantially right angle relative to the outer surface 108. In other words, the primary trigger 124 and the accessory trigger 128 are at substantially right angles relative to each other. The orientation and placement of the triggers 124 and 128 enable operation of the device 100 in either of a top-mounted mode and a side-mounted mode.

Various trigger devices can be used to implement the primary trigger 124 and the accessory trigger 128. In the present example, the primary trigger 124 is an inductive sensor, while the accessory trigger 128 is a button trigger. In other examples, various other types of triggers can be employed for either or both of the triggers 124 and 128 (e.g. capacitive sensors, pressure sensors, temperature sensors, light sensors, and the like).

Figure 2A:
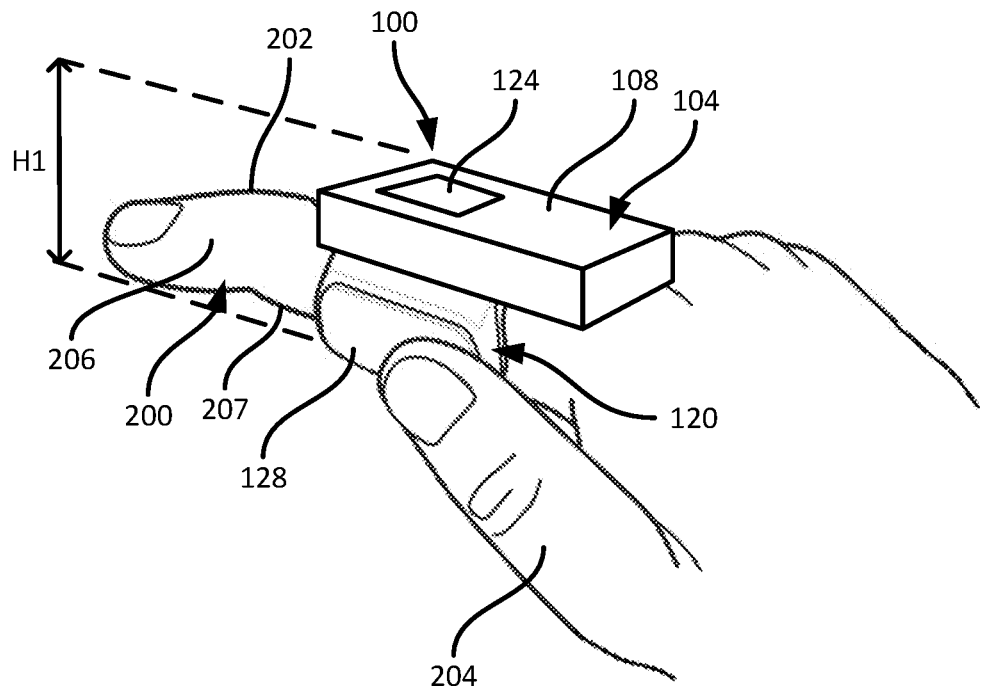
FIG. 2A is a diagram illustrating a perspective view of the data capture device of FIG. 1 in a top-mounted operational mode.
Figure 2B:
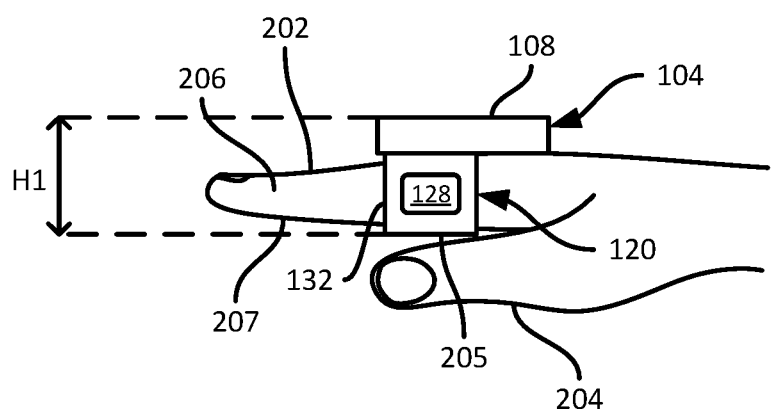
FIG. 2B is a diagram illustrating a side view of the data capture device of FIG. 1 in the top-mounted operational mode.

Turning to FIGS. 2A and 2B, the top-mounted operational mode is illustrated. In particular, the device 100 is mounted on a right index finger 200 of the operator. In the position shown in FIGS. 2A and 2B, the primary housing 104 is disposed on the back or top 202, of the index finger 200. The primary trigger 124 is therefore substantially inaccessible to a right thumb 204 of the operator, while the accessory trigger 128 is accessible to the thumb 204. Therefore, in the top-mounted operational mode, the accessory trigger 128 is disposed on a side 206 of the index finger 200, between the index finger 200 and the thumb 204, for activation by the thumb 204 to initiate a scanning operation. The side 206 is the side facing away from the other fingers of the right hand, towards the thumb 204.

As will be apparent to those skilled in the art, in some scenarios the top-mounted operational mode may be impractical. For example, when the operator is required to reach into narrow spaces, such as between boxes or other packages, the primary housing 104 may impede such reaching by increasing a height "H1" between the lowest and highest points of the device 100, measured in a plane extending through the top 202 and bottom 207 of the finger 200. In the top-mounted operational mode, therefore, the height H1 is the distance between a lower surface 205 of the mounting accessory 120 (specifically, the lower surface of the wall 132) abutted against the bottom side 207, and the outer surface 108 of the housing 104. Various other tasks may also be impeded by the primary housing 104 in the top-mounted operational mode, such as operating certain vehicles (e.g. forklifts with shielded or recessed throttle handles). The device 100 therefore also enables scanning in a side-mounted operational mode, shown in FIGS. 3A and 3B.

Figure 3A:
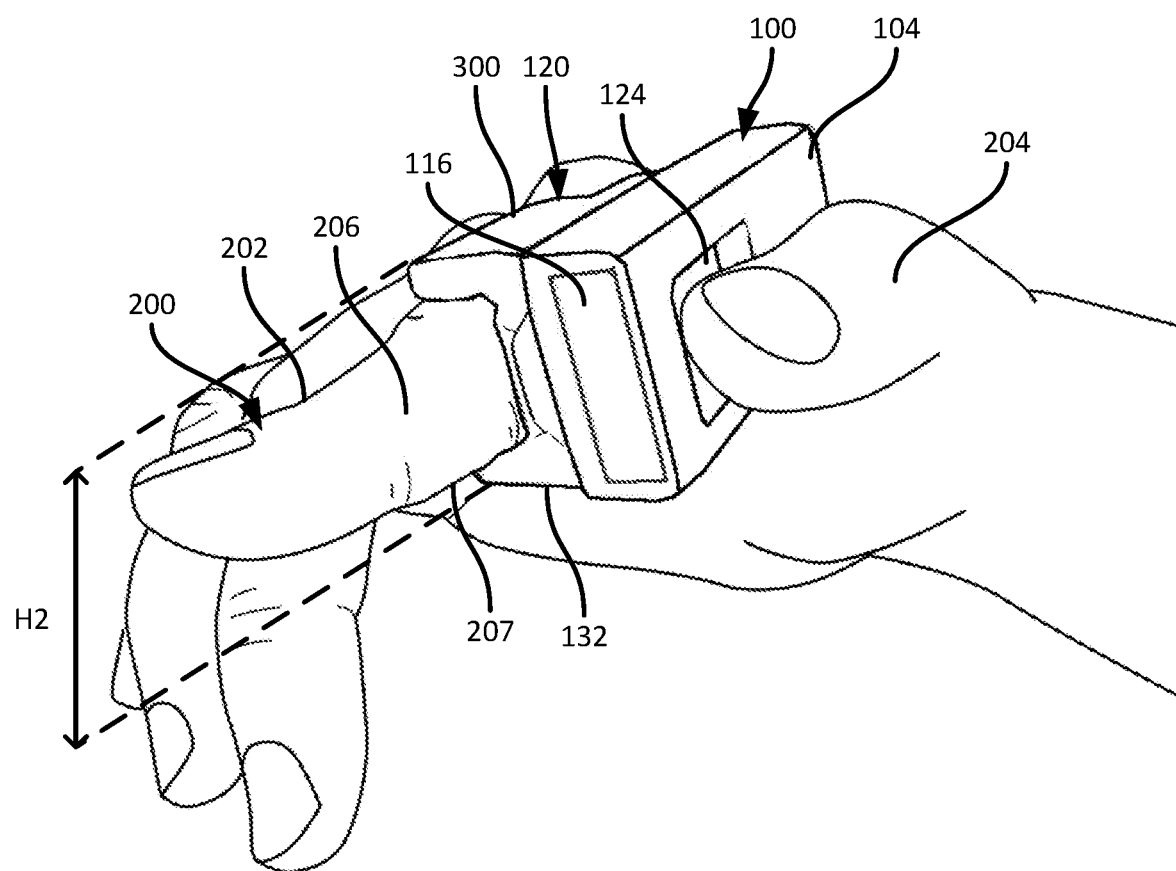
FIG. 3A is a diagram illustrating a perspective view of the data capture device of FIG. 1 in a side-mounted operational mode.
Figure 3B:
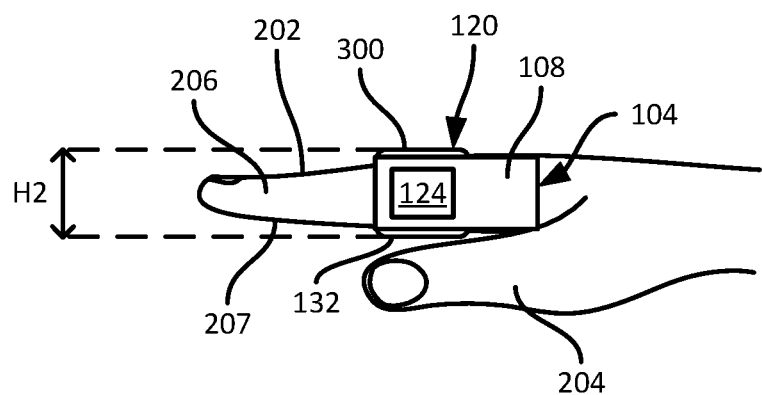
FIG. 3B is a diagram illustrating a side view of the data capture device of FIG. 1 in the side-mounted operational mode.

Turning to FIGS. 3A and 3B, the side-mounted operational mode of the device 100 is shown. In the side-mounted operational mode, the primary housing 104 is supported on the side 206 of the index finger 200, between the index finger 200 and the thumb 204. The primary trigger 124 is therefore positioned for activation by the thumb 204, while the accessory trigger 128 (not shown in FIGS. 3A and 3B) is underneath the index finger 200. In the side-mounted operational mode shown in FIGS. 3A and 3B, a height H2 between the lowest and highest points of the device 100 is smaller than the height H1 shown in FIGS. 2A and 2B. Specifically, in the side-mounted operational mode the height H2 is the distance between the wall 132 of the mounting accessory 120 and an opposing wall 300 (or strap, or other suitable structure, as will be discussed further below) of the mounting accessory 120. The height H2 is smaller than the height H1 because the primary housing 104 contributes less, or not at all, to the height H2. The operator can therefore more readily reach into narrow spaces while operating the device 100 in the side-mounted mode. In side mounted operational mode of the device 100, the primary housing 104 height allows for optimal operation of primary trigger 124 by effectively utilizing the space between thumb and index finger without negatively impacting operator comfort. The size of the primary housing 104, and the position of the primary trigger 124 in side-mounted operational mode of the device 100 permits access and reach to the trigger without inducing fatigue on muscles in the palm (lumbricals and thenar).

The provision of distinct triggers, in the form of the primary trigger 124 on the primary housing 104 itself, and the accessory trigger 128 on the mounting accessory, enables the above-mentioned dual-mode operation of the device 100. As will be discussed below, the device 100 also includes certain additional features to enable, for example, ambidextrous operation of the device 100.

Figure 4:
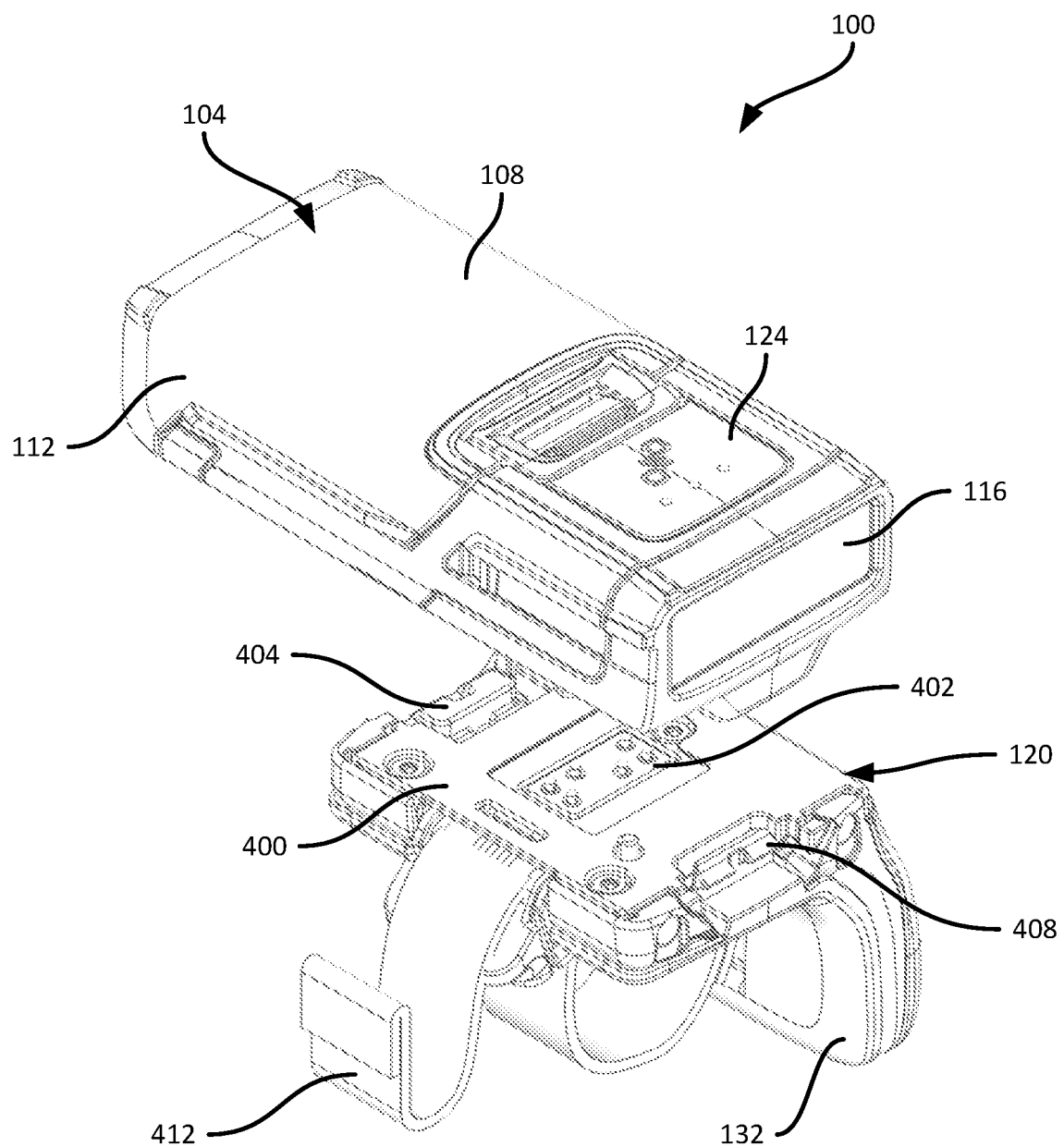
FIG. 4 is an exploded view of the data capture device of FIG. 1, viewed from above.
Figure 5:
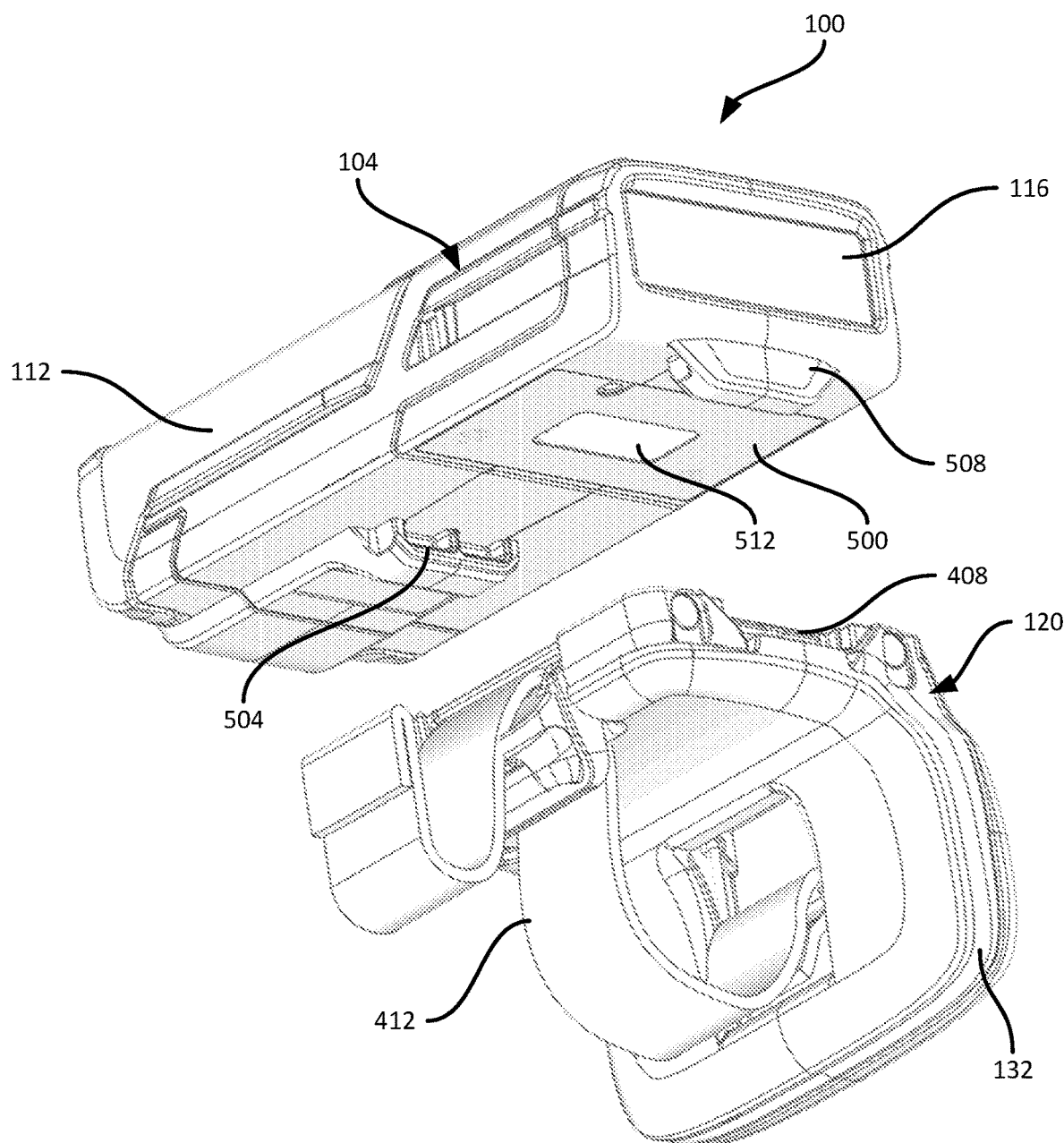
FIG. 5 is an exploded view of the data capture device of FIG. 1, viewed from below.

Referring to FIGS. 4 and 5, exploded views of the device 100 are shown, with the primary housing 104 separated from the mounting accessory 120. The primary housing 104, in the illustrated example, is removably coupled to the mounting accessory. As seen in FIG. 4, the mounting accessory includes a mounting surface 400 that faces the inner surface of the primary housing 104. The mounting surface 400 includes an electrical interface 402 for communicating with the primary housing 104. In the present example, the electrical interface 402 includes a set of electrical contacts, such as pogo pins. The mounting surface 400 includes a latching mechanism, which in the present example includes a movable (e.g. spring-loaded) latch 404 and a static latch 408. The latching mechanism cooperates with corresponding structures on the inner surface of the primary housing 104 (discussed below in connection with FIG. 5) to removably couple the primary housing 104 to the mounting accessory 120. In addition, the mounting accessory 120 includes a strap 412 for attachment to an index finger of an operator (e.g. the index finger 200 shown in FIGS. 2 and 3).

FIG. 5 illustrates an inner surface 500 of the primary housing 104, as mentioned earlier. The inner surface 500 is configured to engage with the mounting surface 400 of the mounting accessory 120. In particular, the inner surface 500 includes a pair of hooks 504 and 508, each configured to engage with either of the movable latch 404 and the static latch 408. That is, the primary housing 104 can be coupled to the mounting accessory 120 in either of two orientations, enabling ambidextrous use of the device 100.

The inner surface 500 also includes an electrical interface 512, such as a set of electrical contacts, configured to engage with the contacts of the interface 402 of the mounting accessory 120 and thereby interconnect the mounting accessory 120 with the primary housing 104. For example, the interfaces 402 and 512 transmit trigger press indications to a controller in the primary housing 104 when the accessory trigger 128 is activated.

Figure 6:
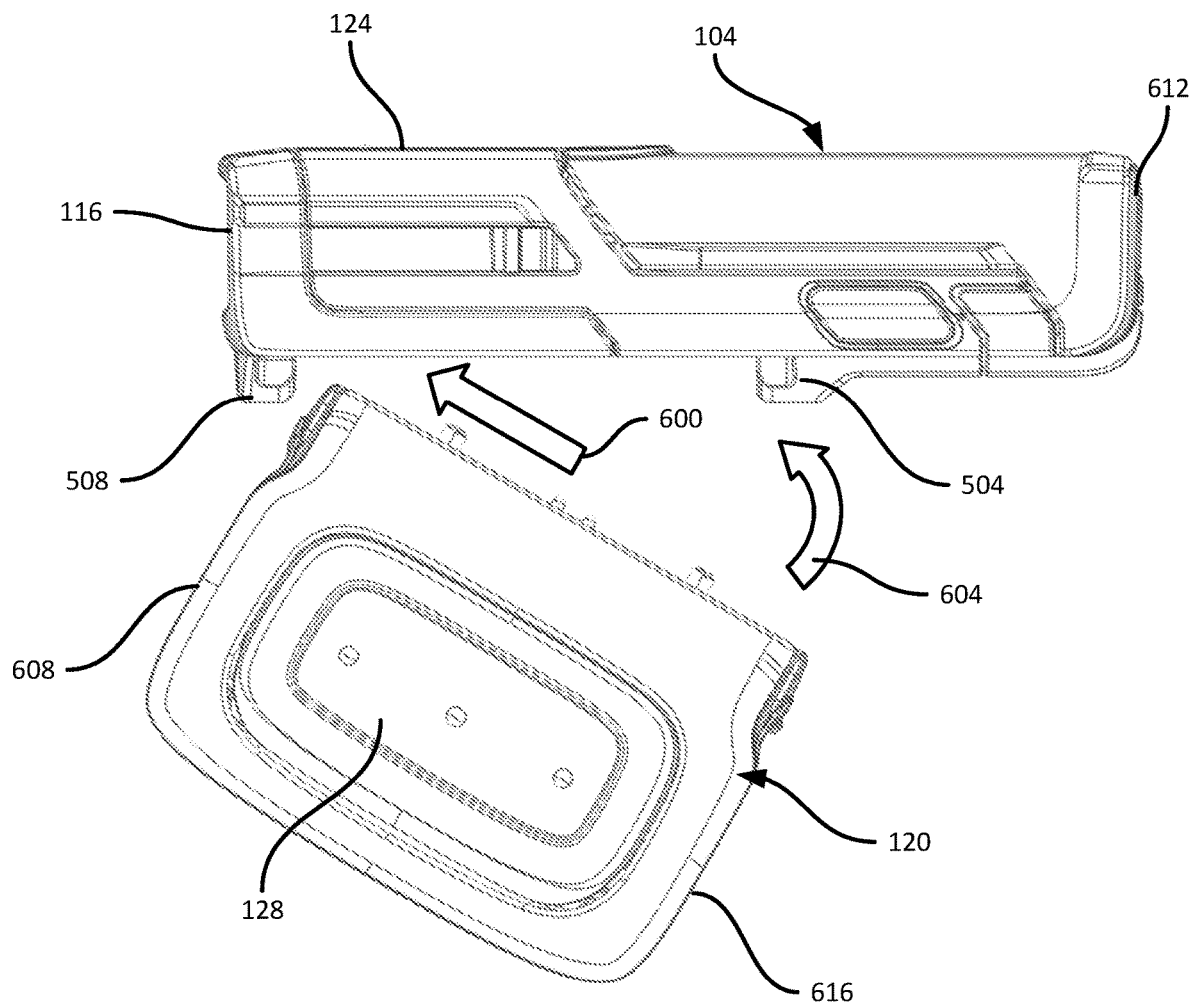
FIG. 6 is a side view of the data capture device of FIG. 1, illustrating the coupling of the primary housing with the mounting accessory.

Turning to FIG. 6, attachment of the primary housing 104 to the mounting accessory 120 is illustrated. In particular, the static latch 408 is place into one of the hooks 504 and 508 (the hook 508, in the present example) by moving the mounting accessory 120 in the direction 600. The mounting accessory 120 is then pressed upwards in the direction 604, towards the inner surface 500 of the primary housing 104, to engage the movable latch 404 with the other hook (the hook 504, in the present example). The movable latch 404 retracts upon contact with the hook 504, and then extends into the hook 504 to retain the mounting accessory 120 against the primary housing 104. To remove the mounting accessory 120 from the primary housing 104, the primary housing is pushed towards the static latch 408 to compress the movable latch 404 into the retracted position. Such movement disengages the hook 508 from the static latch 408, and permits the end of the primary housing near the hook 508 to be released from the mounting accessory 120. The hook 504 can then also be removed from the mounting accessory 120.

As will be apparent, the hooks 504 and 508 can each engage either of the latches 404 and 408, permitting the primary housing 104 to be connected to the mounting accessory 120 in either of two orientations. In the orientation shown in FIG. 6, the device 100 is configured for right-handed use, as the accessory trigger 128 is arranged for placement between the right index finger and right thumb when the device 100 is top-mounted. The primary trigger 124 is arranged for placement atop the right index finger in when the device 100 is top-mounted, and for placement between the right index finger and the right thumb when the device is side-mounted. Further, as illustrated in FIG. 6 (and also visible in FIG. 1), the scan window 116 is substantially aligned with one end 608 of the mounting accessory 120, while an opposing end 612 of the primary housing extends beyond the opposing end 616 of the mounting accessory.

The removable coupling of the primary housing 104 with the mounting accessory 120 also enables the device 100 to employ a variety of mounting accessories. In some examples, the primary housing 104 can be coupled with a mounting accessory that does not include an accessory trigger. In other examples, a mounting accessory can be coupled to the primary housing 104 that includes a ruggedized trigger.

In further examples, the primary housing 104 can be coupled with a mounting accessory that includes two accessory triggers, one on either side of the mounting accessory. Such a mounting accessory, as will be understood by those skilled in the art, enables ambidextrous use of the device 100 without changing the orientation of the primary housing 104 relative to the mounting accessory 120. An example of a dual-trigger mounting accessory is illustrated in FIG. 7.

Figure 7:
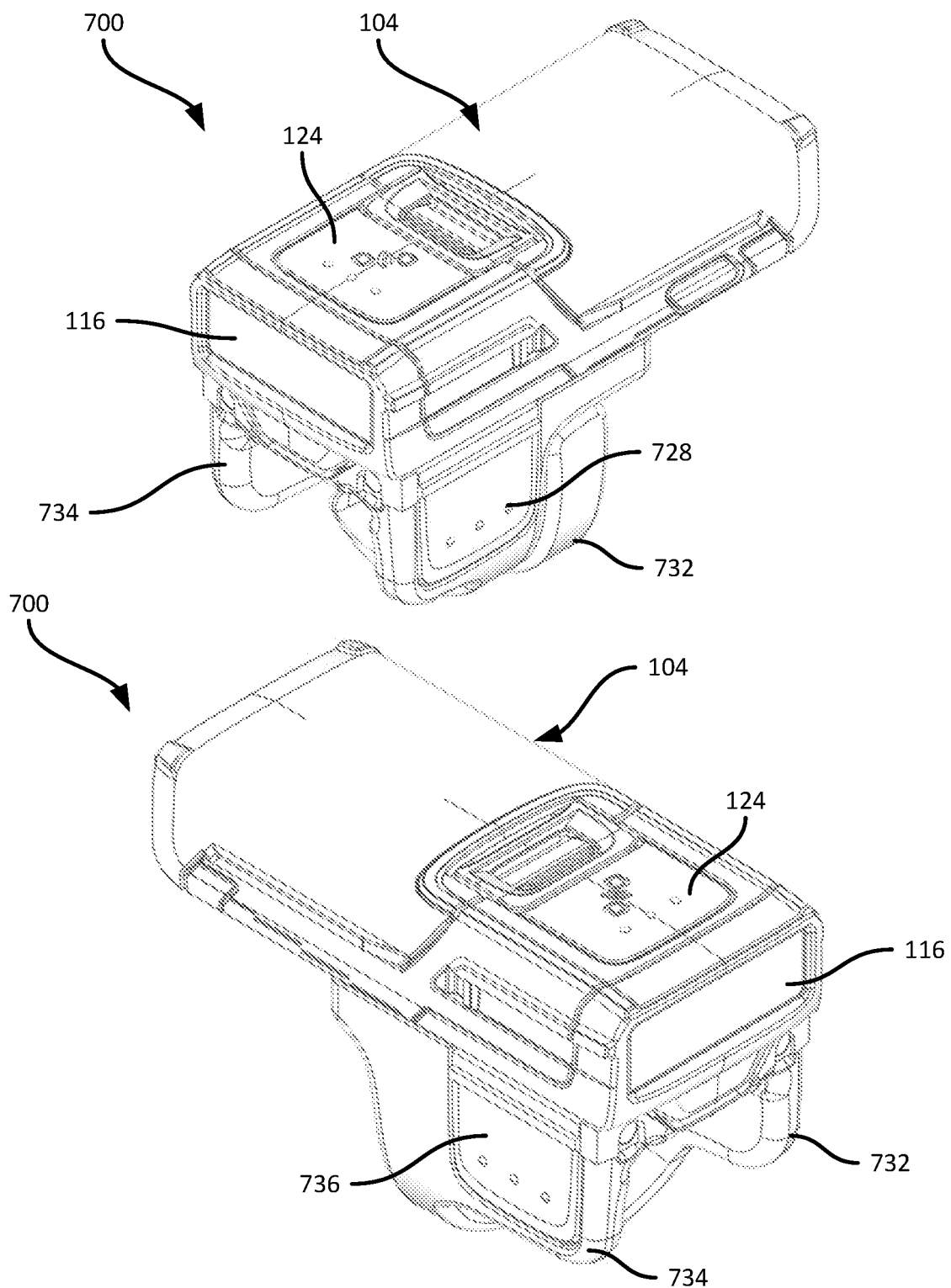
FIG. 7 is a diagram illustrating isometric views of a data capture device according to another embodiment.

FIG. 7 illustrates a data capture device 700 including the primary housing 104 connected to a mounting accessory 720 that includes two opposing walls 732 and 734, rather than a single wall 132 as shown earlier. The wall 732 supports a first accessory trigger 728, for right-handed use in the top-mounted operational mode, and the wall 734 supports a second accessory trigger 736, for left-handed use in the top-mounted operational mode.

Figure 8:
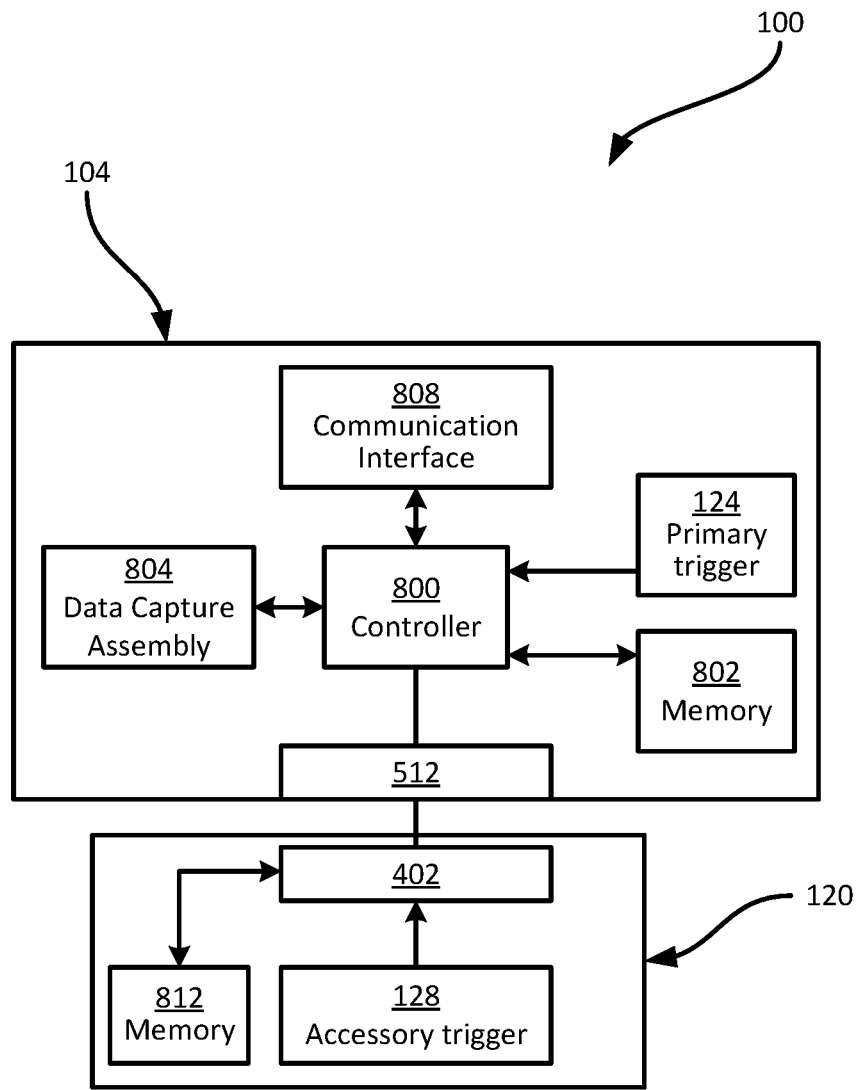
FIG. 8 is a block diagram illustrating certain internal components of the data capture device of FIG. 1.

Turning now to FIG. 8, certain internal components of the device 100 are illustrated. The device 100, and in particular the primary housing 104, includes a controller 800, such as a central processing unit (CPU), interconnected with a non-transitory computer-readable storage medium, such as a memory 802. The memory 802 can include a suitable combination of volatile memory (e.g. Random Access Memory (RAM)) and non-volatile memory (e.g. read only memory (ROM), Electrically Erasable Programmable Read Only Memory (EEPROM), flash). The controller 800 and the memory 802 comprise one or more integrated circuits (ICs).

The primary housing 104 also contains a data capture assembly 804 connected with the controller 800. The data capture assembly 804 can include one or more cameras or other image sensors, and/or laser emitter(s) and sensor(s) for detecting reflections of emitted laser beams, or the like. The primary housing 104 also supports the primary trigger 124 and the interface 512, as noted earlier. The primary housing 104 can also include a communication interface 808, such as a wireless communication interface (e.g. Bluetooth or the like) for communicating with another computing device (not shown).

The mounting accessory 120 includes the interface 402 and the accessory trigger 128, and can also include a memory 812. The memory 812 may contain, for example, an accessory identifier retrievable by the controller 800. The controller 800 can be configured to detect, for example, when the primary housing 104 has been connected with the mounting accessory 120, and can retrieve the accessory identifier from the memory 812 responsive to such detection. The controller 800 can then be configured, e.g. based on a mapping of accessory identifiers to trigger functions stored in the memory 802, to enable or disable one or both of the triggers 124 and 128. For example, some mounting accessories may not permit operation of the device 100 in the side-mounted mode, and the controller 800 can therefore disable the primary trigger 124 when such mounting accessories are connected.

In other examples, the controller 800 can be configured to detect whether the device 100 is operating in the side-mounted mode or the top-mounted mode, and can enable or disable one of the triggers 124 and 128 accordingly. Detection may be performed by receiving input from an operator, e.g. voice input, activation of another button, a specific sequence of activations of the triggers 124 and 128, or the like. In other examples, detection may be performed automatically by the controller 800, for example by disabling the other of the triggers 124 and 128 when two or more consecutive actuations of one of the triggers 124 and 128 are detected (indicating that that trigger is currently in use and the other can be ignored).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A data capture device, comprising:
a primary housing supporting a data capture assembly and having inner and outer surfaces joined by a perimeter wall;
a mounting accessory coupled to the inner surface of the primary housing, the mounting accessory configured to mount the data capture device on an index finger of an operator in a top-mounted operational mode, wherein the primary housing is disposed on a back of the index finger;
an accessory trigger supported on the mounting accessory such that in the top-mounted operational mode, the accessory trigger is disposed between the index finger and a thumb of the operator, for activation by the thumb of the operator;
wherein the mounting accessory includes a latch, disposed at an end of the mounting accessory and having a pair of latching members separated by an opening, the latch configured to couple the mounting accessory to a first hook disposed on the inner surface of the primary housing.

2. The data capture device of claim 1, wherein the primary trigger includes an inductive sensor.

3. The data capture device of claim 1, wherein the inner surface includes a second hook, the first hook and the second hook each configured to engage the latch in a first orientation or a second orientation.

4. The data capture device of claim 1, wherein the mounting surface includes a first electrical interface, and wherein the inner surface of the primary housing includes a second electrical interface configured to engage with the first electrical interface.

* * * * *